US012784739B2

(12) United States Patent
Wu et al.

(10) Patent No.: US 12,784,739 B2
(45) Date of Patent: Nov. 3, 2026

(54) SYSTEMS AND METHODS FOR MULTI-MODAL CONTINUAL PRE-TRAINING OF AUDIO ENCODERS

(71) Applicant: Robert Bosch GmbH, Stuttgart (DE)

(72) Inventors: Ho-Hsiang Wu, Morrisville, NC (US); Gyuhak Kim, San Francisco, CA (US); Luca Bondi, Pittsburgh, PA (US); Samarjit Das, Wexford, PA (US)

(73) Assignee: Robert Bosch GmbH (DE)

( * ) Notice: Subject to any disclaimer, the term of this patent is extended or adjusted under 35 U.S.C. 154(b) by 161 days.

(21) Appl. No.: 18/633,820

(22) Filed: Apr. 12, 2024

(65) Prior Publication Data

US 2025/0322823 A1 Oct. 16, 2025

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
CPC ....... G10L 15/063; G10L 15/16; G10L 25/30; G06N 3/045; G06N 3/0455; G06N 3/0464; G06N 3/08; G06N 3/082; G06N 3/084; G06N 3/088; G06N 3/096
See application file for complete search history.

(56) References Cited

U.S. PATENT DOCUMENTS

2020/0293826 A1* 9/2020 Liu ........................ G06N 3/088
2024/0013564 A1* 1/2024 Kim ..................... G06V 10/454
2024/0144007 A1* 5/2024 Wu .......................... G06N 3/08

FOREIGN PATENT DOCUMENTS

CN 115688937 A * 2/2023

OTHER PUBLICATIONS

Wu et al. (WAV2CLIP: Learning Robust Audio Representations from CLIP), Apr. 27, 2022 https://ieeexplore.ieee.org/document/9747631 (Year: 2022).*
Radford, Alec et al, Learning Transferable Visual Models From Natural Language Supervision, Proceedings of the 38th International Conference on Machine Learning, PMLR 139, 2021, pp. 1-16.
Guzhov, Andrey et al., AudioCLIP: Extending CLIP to Image, Text and Audio, Jun. 24, 2021, pp. 1-14.
Elizalde, Benjamin, CLAP: Learning Audio Concepts From Natural Language Supervision, Microsoft, Jun. 9, 2022, pp. 1-9.
Fini, Enrico et al, Self-Supervised Models are Continual Learners, University of Trento, 2022, pp. 1-13.
(Continued)

*Primary Examiner* — Yogeshkumar Patel
(74) *Attorney, Agent, or Firm* — Dickinson Wright PLLC

(57) ABSTRACT

A method for training an audio encoder includes receiving first training data comprising first audio data, performing a first training task on an audio encoder using the first training data, receiving second training data comprising first image data and second audio data, and performing a second training task on the audio encoder using the second training data. The method also includes receiving third training data comprising first text data and third audio data, performing a third training task on the audio encoder using the third training data, and performing at least one downstream task using the audio encoder.

20 Claims, 10 Drawing Sheets

(56) References Cited

OTHER PUBLICATIONS

Hinton, Geoffrey et al, Distilling the Knowledge in a Neural Network, Mar. 9, 2015, pp. 1-9.
Wu, Ho-Hsiang et al., WAV2CLIP: Learning Robust Audio Representations From Clip, Music and Audio Research Laboratory, New York University, USA, Feb. 15, 2022, pp. 1-5.
McCloskey, Michael et al, Catastrophic Interference in Connectionist Networks: The Sequential Learning Problem, The Psychology of Learning and Motivation, vol. 24, 1989, pp. 1-57.
Kong, Qiuqiang et al., PANNs: Large-Scale Pretrained Audio Neural Networks for Audio Pattern Recognition, Aug. 23, 2020, pp. 1-15.
Wu, Yusong et al, Large-Scale Contrastive Language-Audio Pretraining with Feature Fusion and Keyword-to-Caption Augmentation, Mila, Quebec Artificial Intelligence Institute, Universite de Montreal, Apr. 8, 2023, pp. 1-10.
Li, Zhizhong et al, Learning without Forgetting, Department of Compter Science, University of Illinois, Urbana Champaign, Illinois, Feb. 14, 2017, pp. 1-13.
Ni, Zixuan et al, continual Vision-Language Representation Learning with Off-Diagonal Information, Proceedings of the 40th International Conference of Machine Learning, Honolulu, Hawaii, USA, Jun. 1, 2023, pp. 1-21.

* cited by examiner

SYSTEMS AND METHODS FOR MULTI-MODAL CONTINUAL PRE-TRAINING OF AUDIO ENCODERS

TECHNICAL FIELD

The present disclosure relates to the training and/or fine-tuning machine learning models, and in particular to systems and methods for multi-modal continual pre-training of audio encoders.

BACKGROUND

Machine learning models, such as audio encoders, are typically trained with single pretext task, via supervised or self-supervised training approaches. Pre-training such encoders with multiple tasks is typically challenging due to a lack of data from different modalities with human annotations. Further, such models may be limited and/or difficult to generalize to other downstream tasks beyond the modalities involved in pre-training.

SUMMARY

An aspect of the disclosed embodiments includes a method for training an audio encoder. The method includes receiving first training data comprising first audio data, performing a first training task on an audio encoder using the first training data, receiving second training data comprising first image data and second audio data, and performing a second training task on the audio encoder using the second training data. The method also includes receiving third training data comprising first text data and third audio data, performing a third training task on the audio encoder using the third training data, and performing at least one downstream task using the audio encoder.

Another aspect of the disclosed embodiments includes a system for training an audio encoder. The system includes a computing device that includes at least one processor and at least one memory, the at least one memory including instructions that, when executed by the at least one processor, cause the at least one processor to: receive first training data comprising first audio data; perform a first training task on an audio encoder using the first training data; receive second training data comprising first image data and second audio data; perform a second training task on the audio encoder using the second training data; receive third training data comprising first text data and third audio data; perform a third training task on the audio encoder using the third training data; and perform at least one downstream task using the audio encoder.

Another aspect of the disclosed embodiments includes an apparatus for training an audio encoder. The apparatus includes a computing device configured to: receive first training data comprising first audio data; perform a first training task on an audio encoder using the first training data, wherein the first training task includes a supervised learning task that includes training the audio encoder for supervised classification on an audio dataset with labels; receive second training data comprising first image data and second audio data; perform a second training task on the audio encoder using the second training data, wherein the second training task includes a self-supervised learning task that includes training the audio encoder by transferring knowledge from a pre-trained image encoder onto the audio encoder; receive third training data comprising first text data and third audio data; perform a third training task on the audio encoder using the third training data, wherein the third training task includes a self-supervised learning task that includes fine-tuning the audio encoder by transferring knowledge of a pre-trained text encoder onto the audio encoder; and perform at least one downstream task using the audio encoder.

DETAILED DESCRIPTION

Figure 1:
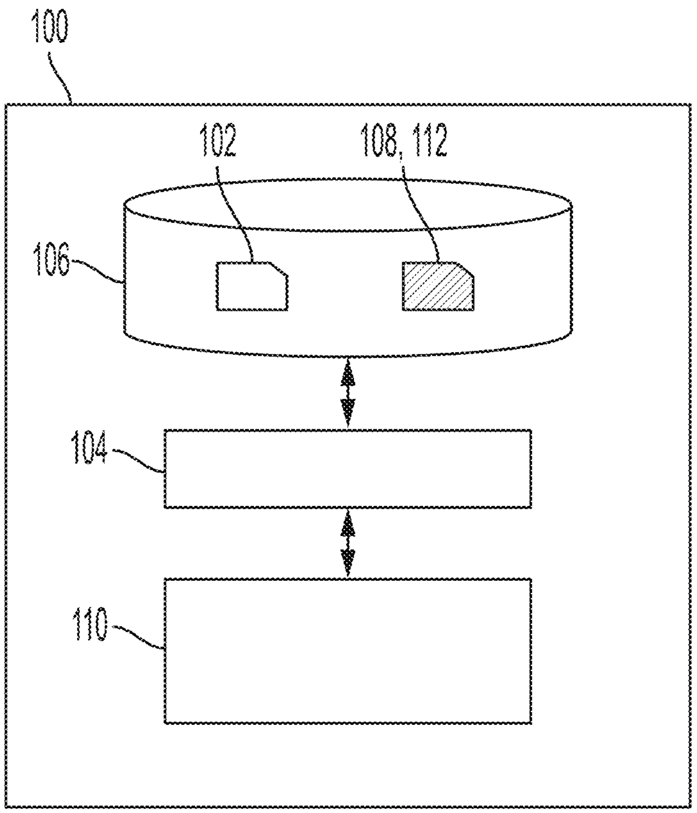
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, audio encoders are typically pre-trained with various pretext tasks. For example, a series of convolutional neural network (CNN) based encoders may be pre-trained via supervised learning method using a massive audio dataset with human annotations. As self-supervised learning approaches become popular and are applied to audio pre-training, various multi-modal signals are leveraged to provide supervisions, especially through contrastive loss such as contrastive language-image pre-training (CLIP).

For example, various pre-training techniques may exploit an implicit assumption that audio-visual correspondences exist in video data, and/leverage audio captioning data to provide supervision between audio and text modalities. However, such audio encoders are typically pre-trained with a single pretext task. As such, it may be difficult to generalize the audio encoders to other downstream tasks beyond those modalities involved in pre-training.

Alternatively, continual learning (CL) is increasingly becoming a research paradigm with the goal of gradually extending acquired knowledge for learning systems. CL aims to learn from a sequence of tasks, with the main challenge being to reduce or avoid catastrophic forgetting. Continual learning typically focuses on downstream tasks, such as changing input conditions (e.g. domain adaptation) or introducing new classes. There are several families of CL methods, including replay and regularization-based. Learning without forgetting (LwF) uses the outputs from previous model to mitigate forgetting and transfer knowledge in regularization terms, which can be applied to pre-training scenarios more flexibly. However, currently systems for training audio encoders may be resource intensive, and typically result in audio encoders that cannot be generalized for various downstream tasks.

Accordingly, systems and methods, such as the systems and methods described herein, configured to improve pre-training of audio encoders configured for generalization for various downstream tasks, may be desirable. In some embodiments, the systems and methods described herein may be configured to leverage continual learning methods to pre-train audio encoders with a sequence of diverse pretext tasks, including audio only and multi-modal, supervised and self-supervised approaches. The systems and methods described herein may be configured to improve audio representation learning via multi-modal continual pre-training, where the audio encoders can be utilized on various downstream applications, including audio tasks, such as audio tagging and classification, and cross-modal tasks such as language-based audio retrieval.

Figure 3A:
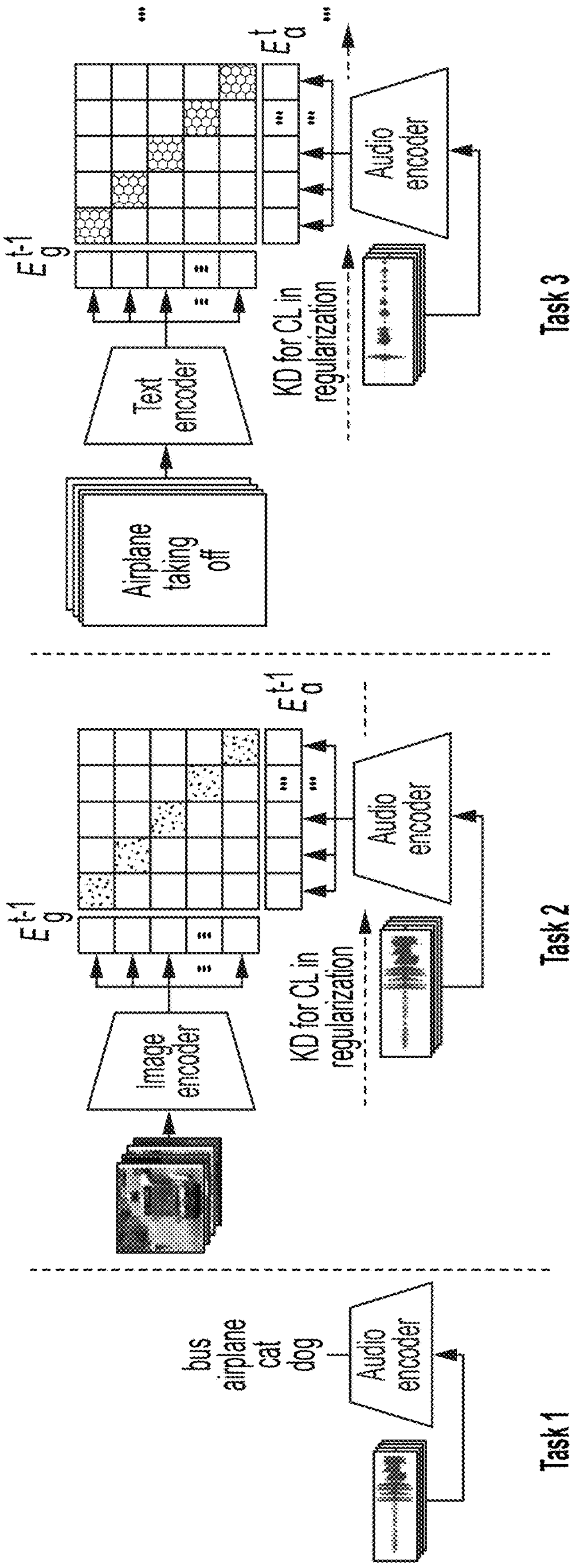
FIG. 3A generally illustrates a training framework according to the principles of the present disclosure.

The systems and methods described herein may be configured to, as is generally illustrated in FIG. 3A (e.g., which illustrates a training framework), pre-train the audio encoder on a sequence of pretext tasks using audio only and multi-modal data with proposed continual pre-training methods using CL techniques. The systems and methods described herein may be configured to pre-train the audio encoder with a sequence of tasks including supervised learning (Task 1), self-supervised learning on image-audio pairs (Task 2), and self-supervised learning on text-audio pairs (Task 3) on single and multi-modal datasets, with knowledge distillation (KD) as regularization terms for CL between successive tasks.

The systems and methods described herein may be configured to, for each pretext task, w adopt three different types of tasks and training methods. For example, the systems and methods described herein may be configured to use an audio only task to pre-trained audio the encoders directly from a large scale pre-trained audio neural network (e.g., which may be configured for audio recognition or other suitable task) trained for supervised classification on large audio dataset with labels. Additionally, or alternatively, the systems and methods described herein may be configured to use an audio-visual multi-modal task to transfer knowledge from pre-trained image encoders onto audio encoders through contrastive learning with large audio-visual datasets. Additionally, or alternatively, the systems and methods described herein may be configured to use an audio-text multi-modal task to fine-tune audio and text encoders with contrastive loss via combined human annotated audio captioning datasets, which may be extended to captions generated via large language models.

In some embodiments, the systems and methods described herein may be configured to provide continual pre-training. For example, the pre-training framework of continual pre-training involves KD and may be configured to transfer the knowledge of a large pre-trained teacher network into a compact student network. For a pre-trained teacher network $h^{tchr}$ and a student network $h^{std}$, the knowledge of a model is characterized by the acquired mapping from the input X of the current task to the output vectors $h^{std}(X)$ and $h^{tchr}(X)$. The KD loss is defined by the KL-Divergence and the student network is instructed to mimic the behavior of the teacher model as $KLD(h^{std}(X), h^{tchr}(X))$, where the target network $h^{tchr}$ is fixed and only $h^{std}$ is trained.

The systems and methods described herein may be configured to use CL to reduce and/or eliminate catastrophic forgetting. For example, the current network for task k is seen as a student network and the previous network containing the knowledge of all the learned tasks is a teacher network. For the effect of knowledge accumulation of CL in audio pre-training, the systems and methods described herein may be configured to adopt the three representative CL methods in knowledge distillation: LwF training, continual self-supervised learning (CaSSLe) training, and maintain off-diagonal information-matrix (Mod-X) training.

For example, the systems and methods described herein may be configured to use LwF training for continual learning of classification tasks. The systems and methods described herein may be configured to distill the features for task k, to build an audio encoder instead of a classifier, as:

$$\mathcal{L}_{kd}(\theta_a^k) = KLD(g^{k-1}(f_a^k(X_a)), g^{k-1}(f_a^{k-1}(X_a)))$$

The systems and methods described herein may be configured to use CaSSle training for self-supervised continual learning of uni-modal tasks. the systems and methods described herein may be configured to use an adapter p with parameters $\gamma^k$ to train the audio encoder such that the embeddings are adaptable by a linear function p with loss defined as:

$$\mathcal{L}_{kd}(\theta_a^k, \phi_a^k, \gamma^k) = KLD(p(g^k(f_a^k(X_a))), g^{k-1}(f_a^{k-1}(X_a)))$$

The systems and methods described herein may be configured to use Mod-X training for bimodal learning within the same modality, including, but not limited to, language-vision. The systems and methods described herein may be configured to define knowledge through cosine similarities between embeddings from audio and source encoders, and instruct the current encoders to follow the knowledge of the previous encoders. For learning multi-modal tasks, the systems and methods described herein may be configured to directly apply the Mod-X technique to distill knowledge between tasks. For learning a bimodal task from a unimodal task without a prior source model, the systems and methods described herein may be configured to utilize the current source model and distill the cosine similarities between embeddings from the previous audio encoder and the current source encoder. The systems and methods described herein may be configured to characterize the knowledge from the previous model through the embeddings $$E_a^{k-1}$$

generated by the audio encoder $$f_a^{k-1}$$

and the projection function $g^{k-1}$ in relation to the current audio data $$X_a^k.$$

Similarly, the knowledge of the current model is $$E_a^k$$

generated by $$f_a^k$$

and $g^k$ in relation to $$X_a^k.$$

By characterizing the knowledge of the model as the acquired mapping from input to output vectors, the systems and methods described herein may be configured to instruct the current model to follow the outputs of the previous model, as expressed by:

$$\mathcal{L}_{kd} = KLD\left(E_a^k, E_a^{k-1}\right) \quad (1)$$

The subscript kd denotes knowledge distillation and KLD indicates KL-Divergence loss. After integrating the knowledge of the previous models $$f_a^{k-1}$$

and $g^{k-1}$, the systems and methods described herein may be configured to discard $$f_a^{k-1}$$

and $g^{k-1}$ as neither is used in the future tasks.

The final objective function may be minimized and formulated as:

$$\mathcal{L} = (1-\lambda)\mathcal{L}_c + \lambda\mathcal{L}_{kd}$$

where λ is a hyper-parameter that controls the importance of knowledge distillation.

Figure 3B:
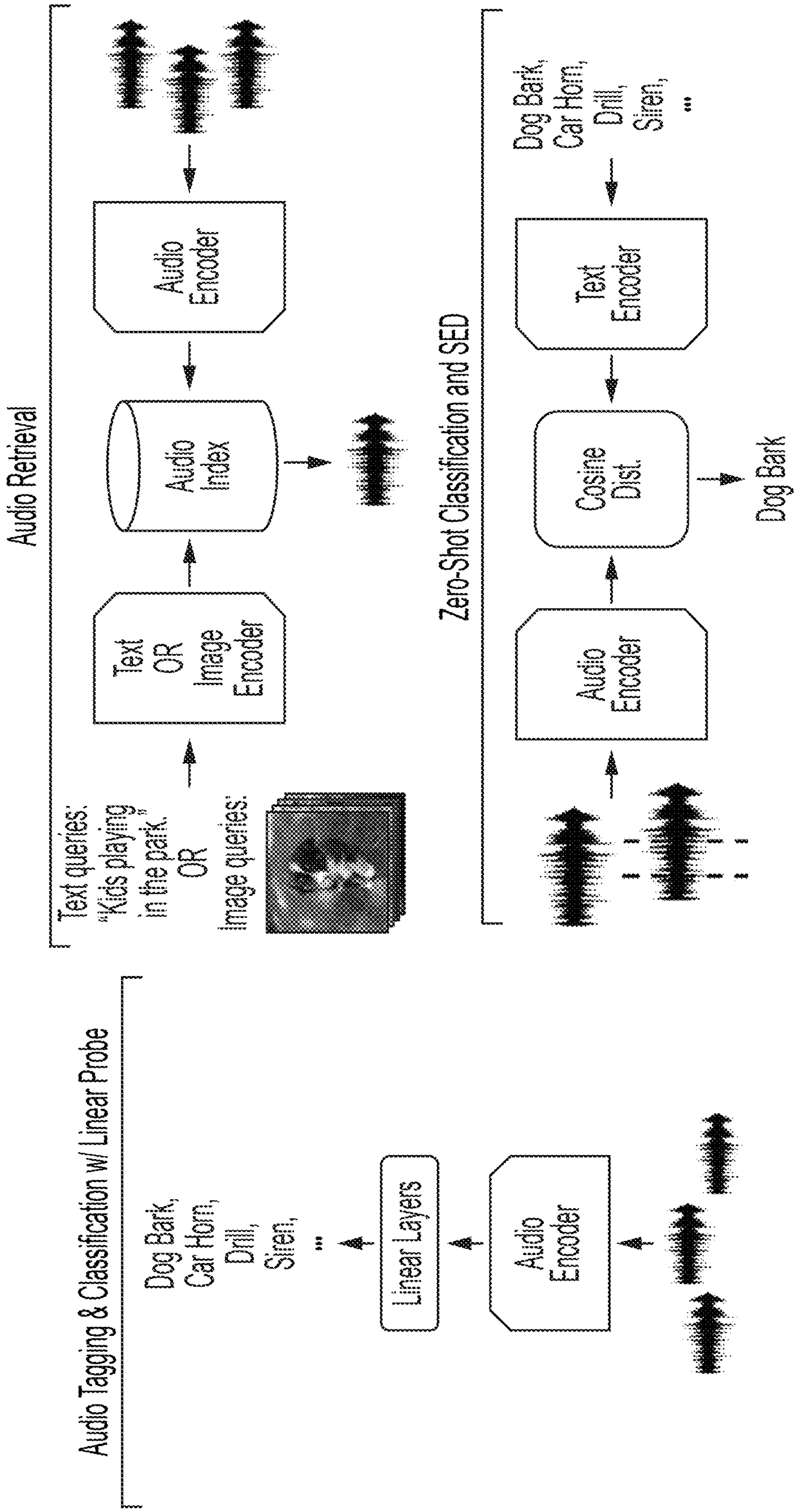
FIG. 3B generally illustrates downstream tasks according to the principles of the present disclosure.

With reference to FIG. 3B, after the audio encoder is trained, the systems and methods described herein may be configured to apply the audio encoder to various downstream tasks involving single modalities, such as audio tagging and classification tasks with pre-defined categories with or without linear probing (e.g., such as a linear layer of a neural network, a logistic regression classifier, or a support vector machine, on top of a frozen, pre-trained audio encoder), audio retrieval with natural language texts or images as queries, and/or zero-shot classification and sound event detection. For the interaction with other modalities, the systems and methods described herein may be configured to use the audio encoder to retrieve relevant audio clips given image or language-based queries. With the audio-text knowledge learned, the systems and methods described herein may be configured to apply the audio encoder to zero-shot classification and sound event detection with free-form text vocabularies.

It should be understood that the systems and methods described herein may be configured to apply the audio encode to any suitable downstream task and function, including, without limitation, to the features generally illustrated and described with respect to FIGS. 5-11.

In some embodiments, the systems and methods described herein may be configured to apply continual learning methods for pre-training audio encoders with a sequence of audio only and multi-modal tasks. The systems and methods described herein may be configured to provide the advantage of leveraging various pretext tasks with associated data, and accumulate knowledge provided from each task for a final general audio encoders. In some embodiments, the systems and methods described herein may be configured to provide a training framework for (KD) in continual pre-training.

In some embodiments, the systems and methods described herein may be configured to receive first training data comprising first audio data. The first training task may include training the audio encoder for supervised classification on an audio dataset with labels. The systems and methods described herein may be configured to perform a first training task on an audio encoder using the first training data. The first training task may include a supervised training task or other suitable task.

The systems and methods described herein may be configured to receive second training data comprising first image data and second audio data. The second training task may include training the audio encoder by transferring knowledge from a pre-trained image encoder onto the audio encoder. Transferring knowledge from the pre-trained image encoder onto the audio encoder may include using contrastive learning with the second training data. The systems and methods described herein may be configured to perform a second training task on the audio encoder using the second training data. The second training task may include a self-supervised training task or other suitable task.

The systems and methods described herein may be configured to receive third training data comprising first text data and third audio data. The third training task may include fine-tuning the audio encoder by transferring knowledge of a pre-trained text encoder onto the audio encoder. Transferring knowledge of the pre-trained text encoder onto the audio encoder may include using contrastive learning with the third training data. The systems and methods described herein may be configured to perform a third training task on the audio encoder using the third training data. The third training task may include a self-supervised training task.

The systems and methods described herein may be configured to perform at least one downstream task using the audio encoder. The at least one downstream task may include audio tagging, audio retrieval, zero-shot classification, and/or the like.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
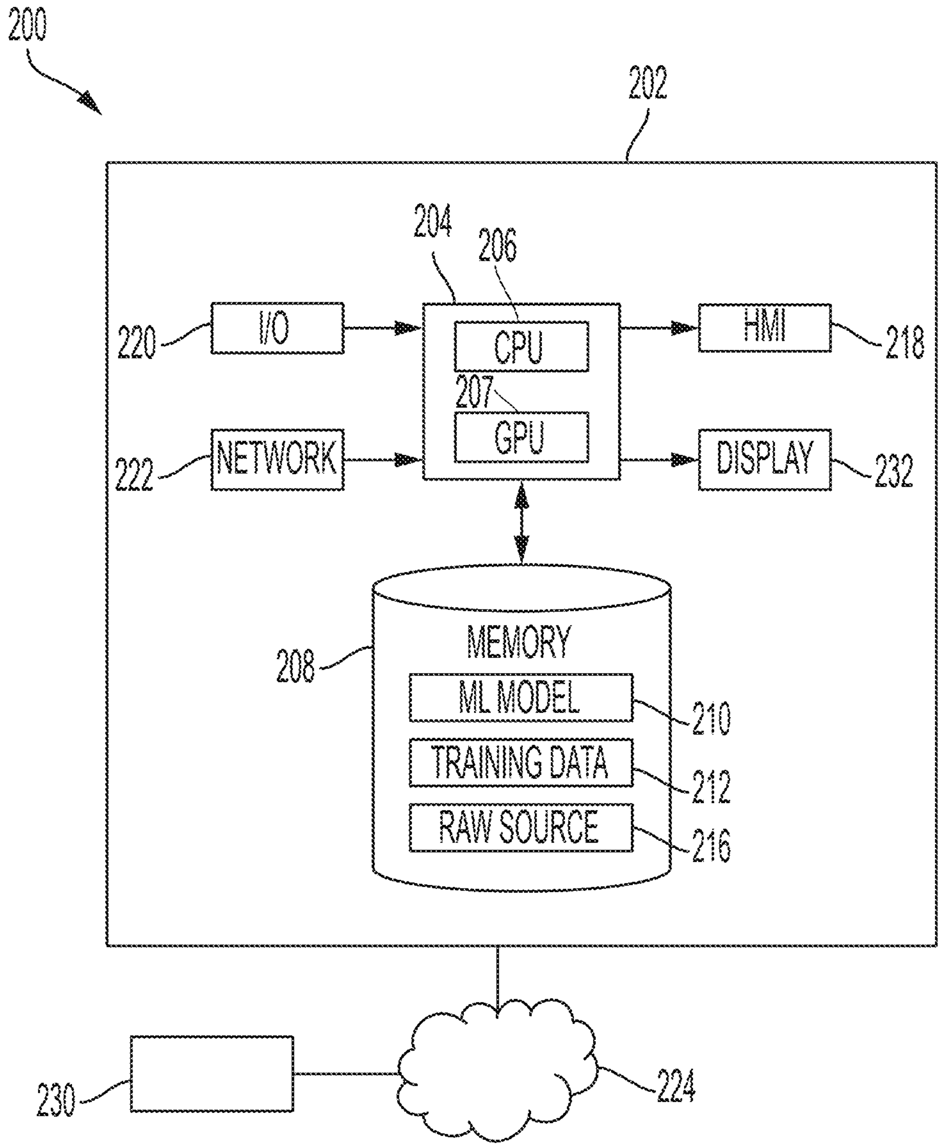
FIG. 2 generally illustrates a computer-implemented method for training and utilizing a neural network, according to the principles of the present disclosure.

FIG. 2 generally illustrates a data annotation/augmentation system 200 configured to provide embodied sound event predictions. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. In some embodiments, the system 200 may include or be in communication with a graphics processing unit (GPU) 207. The GPU 207 may be any suitable GPU 207 configured to perform instructions on an associated memory to, at least, perform at least some of the aspects of the systems and methods described herein. For example, and without limitation, the GPU 207 and the CPU 206 may cooperatively perform model training and inference tasks, as described herein.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 (e.g., which may be referred to as the machine-learning algorithm 210) that is configured to analyze the raw source dataset 216. The raw source dataset 216 may include raw or unprocessed sensor data that may be representative of an input dataset for a machine-learning system. The raw source dataset 216 may include video, video segments, audio, audio segments, images, text-based information, and raw or partially processed sensor data (e.g., radar map of objects). In some embodiments, the machine-learning model 210 may be a neural network algorithm that is designed to perform a predetermined function. For example, the neural network algorithm may be configured in automotive applications to identify pedestrians in video images.

The computer system 200 may store a training dataset 212 for the machine-learning model 210. The training dataset 212 may represent a set of previously constructed data for training the machine-learning model 210. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process. In this example, the training dataset 212 may include audio data, environmental data, dialog data, other suitable data, and/or the like.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to identify sound events in audio data put to the machine-learning model 210.

The machine-learning model 210 may be configured to identify a particular feature in the raw source data 216. The raw source data 216 may include a plurality of instances or input dataset for which various predictions are desired. The machine-learning model 210 may be programmed to process the raw source data 216 to identify the presence of the particular features. The machine-learning model 210 may be configured to predict, using the raw source data 216, sound events in various audio data. The raw source data 216 may be derived from a variety of sources. For example, the raw source data 216 may be actual input data collected by a machine-learning system. The raw source data 216 may be machine generated for testing the system.

In the example, the machine-learning model 210 may process raw source data 216 and output a prediction. The machine-learning model 210 may generate a confidence level (e.g., a certainty value) or factor for each output generated. For example, a confidence value that exceeds a predetermined high-confidence threshold may indicate that the machine-learning model 210 is confident that the prediction. A confidence value that is less than a low-confidence threshold may indicate that the machine-learning model 210 has some uncertainty that the prediction is accurate.

In some embodiments, the system 200 may, using a machine-learning model, such as the machine-learning model 210, receive input dialog captured by an input mechanism (e.g., such as a microphone, keyboard, and/or any other suitable input mechanism). The input dialog may include a text string corresponding to a query.

The system 200, using the machine-learning model 210, may extract, using at least one functional map, at least one keyword from the text string. The at least one functional map may correspond to a neural functional approximator and/or may correlate one or more maps associated with one or more image inputs with corresponding region and object labels. The system 200, using the machine-learning model 210, may generate at least one action prediction based on an input state representation and the at least one keyword. The at least one action prediction may include an action to navigate at least a portion of the environment associated with the machine-learning model 210 and/or other suitable action. The system 200 may predict any suitable number of actions for traversing the environment.

The system 200 may receive, via an image capturing device, one or more images associated with the environment. The system 200, using the machine-learning model 210, may provide a prediction, using the one or more images, identifying one or more objects in the one or more images. Additionally, or alternatively, the system 200 may receive various audio data. The system 200, using the machine learning model 210, may provide a prediction, using the various audio data, identifying target sound event of the various audio data. The system 200 may provide, at an output mechanism (e.g., such as the display 232, HMI 218, I/o 220, or any other suitable mechanism), the prediction.

The system 200 may store, in an associated memory, such as the memory 208 or other suitable memory, the text string, the at least one sub-goal, any other suitable date or information, or a combination thereof. The system 200 may receive feedback in response to providing the prediction. For example, a user of the system 200 may provide verbal, textual or other suitable feedback (e.g., as an input) based on the perspective of the user that the prediction is accurate or correct. The system 200 may subsequently train the machine-learning model 210 based on the feedback (e.g., in order to improve future predations).

In some embodiments, the system 200 may be configured to receive first training data comprising first audio data. The first training task may include training the audio encoder for supervised classification on an audio dataset with labels. The system 200 may perform a first training task on an audio encoder using the first training data. The first training task may include a supervised training task or other suitable task.

The system 200 may receive second training data comprising first image data and second audio data. The second training task may include training the audio encoder by transferring knowledge from a pre-trained image encoder onto the audio encoder. The system 200 may transfer knowledge from the pre-trained image encoder onto the audio encoder using contrastive learning with the second training data. The system 200 may perform a second training task on the audio encoder using the second training data. The second training task may include a self-supervised training task or other suitable task.

The system 200 may receive third training data comprising first text data and third audio data. The third training task may include fine-tuning the audio encoder by transferring knowledge of a pre-trained text encoder onto the audio encoder. The system 200 may transfer knowledge of the pre-trained text encoder onto the audio encoder using contrastive learning with the third training data. The system 200 may perform a third training task on the audio encoder using the third training data. The third training task may include a self-supervised training task.

The system 200 may perform at least one downstream task using the audio encoder. The at least one downstream task may include audio tagging, audio retrieval, zero-shot classification, and/or the like.

In some embodiments, system 200 may apply the audio encoder (e.g., having been pre-trained as described) to any suitable machine, including, but not limited to those described herein, such as those described with respect to FIGS. 5-11. Additionally, or alternatively, it should be understood that the systems and methods described herein may be configured to perform any suitable function, such as those described herein with respect to FIGS. 5-11.

Figure 4:
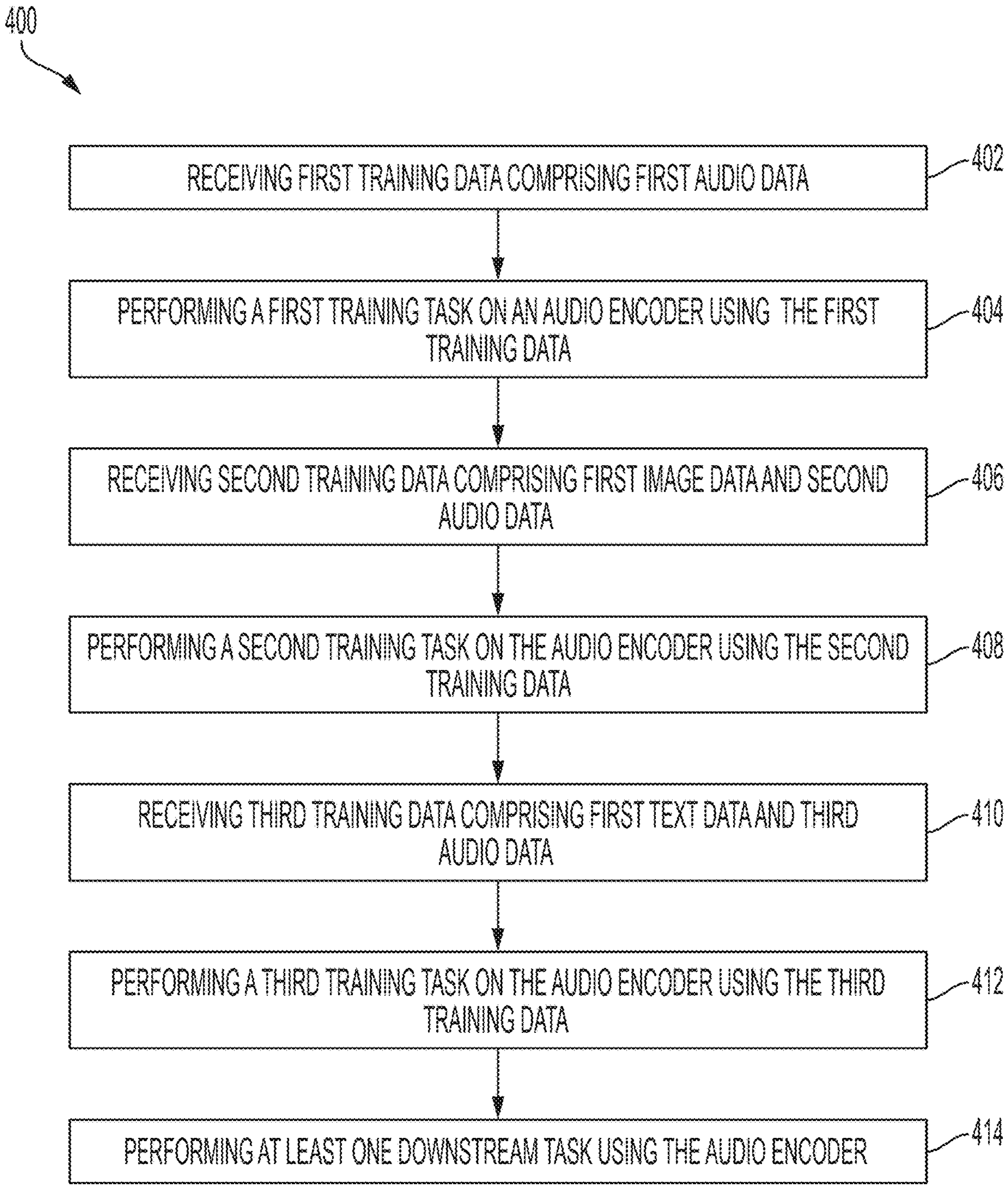
FIG. 4 is a flow diagram generally illustrating an audio encoder training method, according to the principles of the present disclosure.

FIG. 4 is a flow diagram generally illustrating an audio encoder training method 400 according to the principles of the present disclosure. It should be understood that any of the systems described herein, including, but not limited to, the system 200, may be configured to perform the methods described herein. At 402, the method 400 receives first training data comprising first audio data At 404, the method 400 performs a first training task on an audio encoder using the first training data.

At 406, the method 400 receives second training data comprising first image data and second audio data.

At 408, the method 400 performs a second training task on the audio encoder using the second training data.

At 410, the method 400 receives third training data comprising first text data and third audio data.

At 412, the method 400 performs a third training task on the audio encoder using the third training data.

At 414, the method 400 performs at least one downstream task using the audio encoder.

Figure 5:
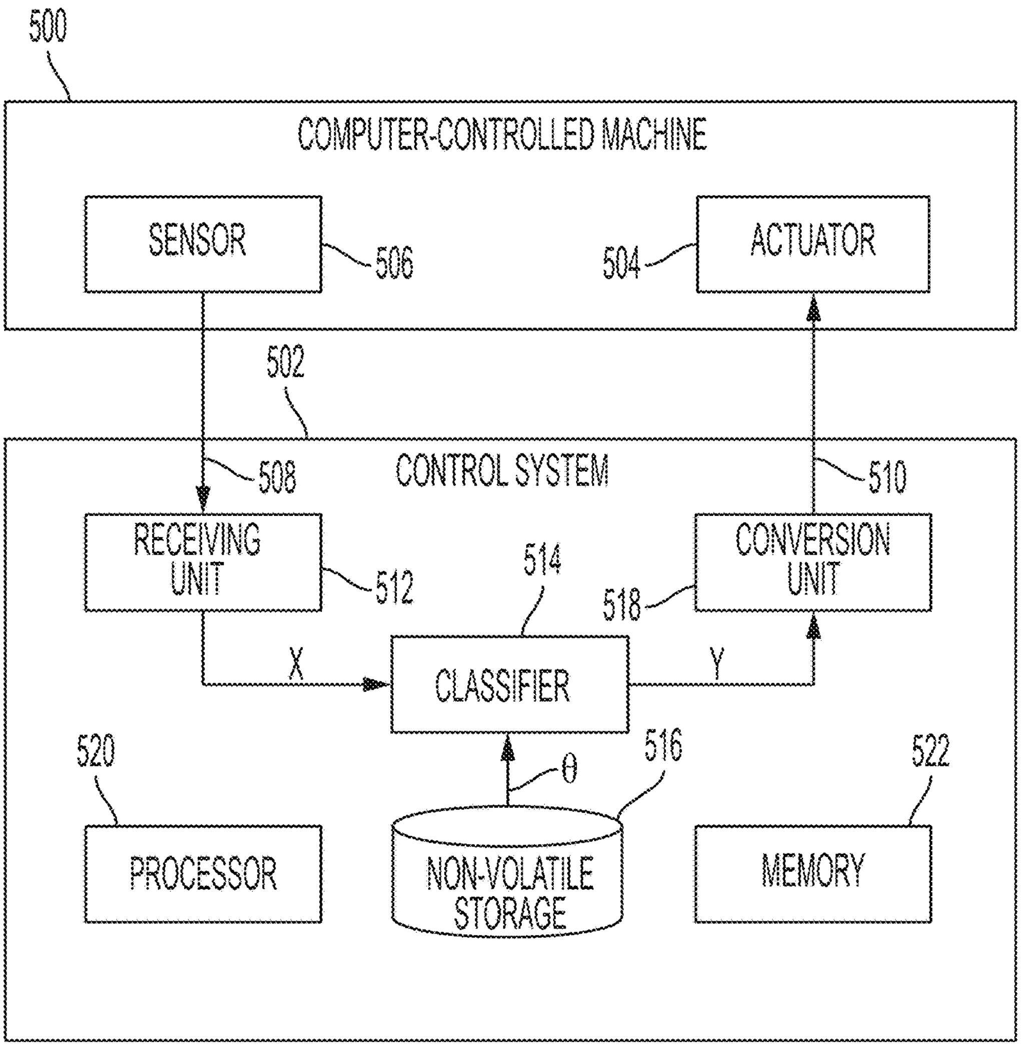
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, graphic processing units, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
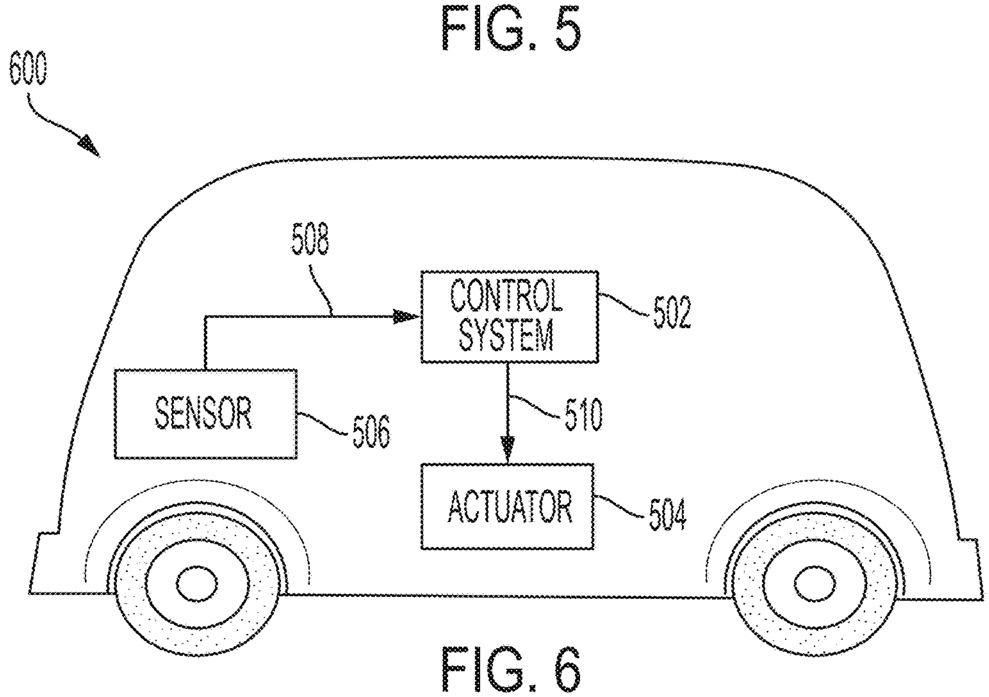
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
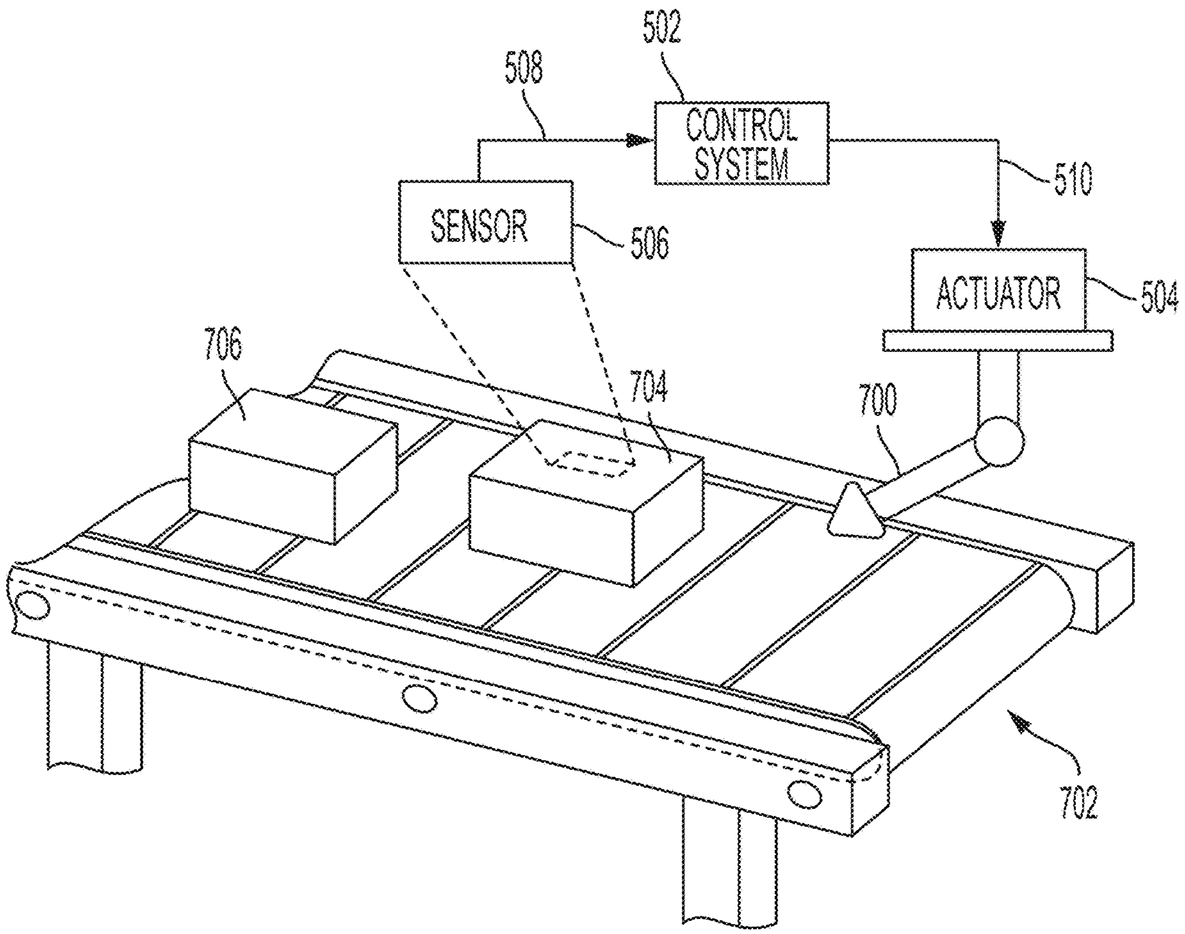
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
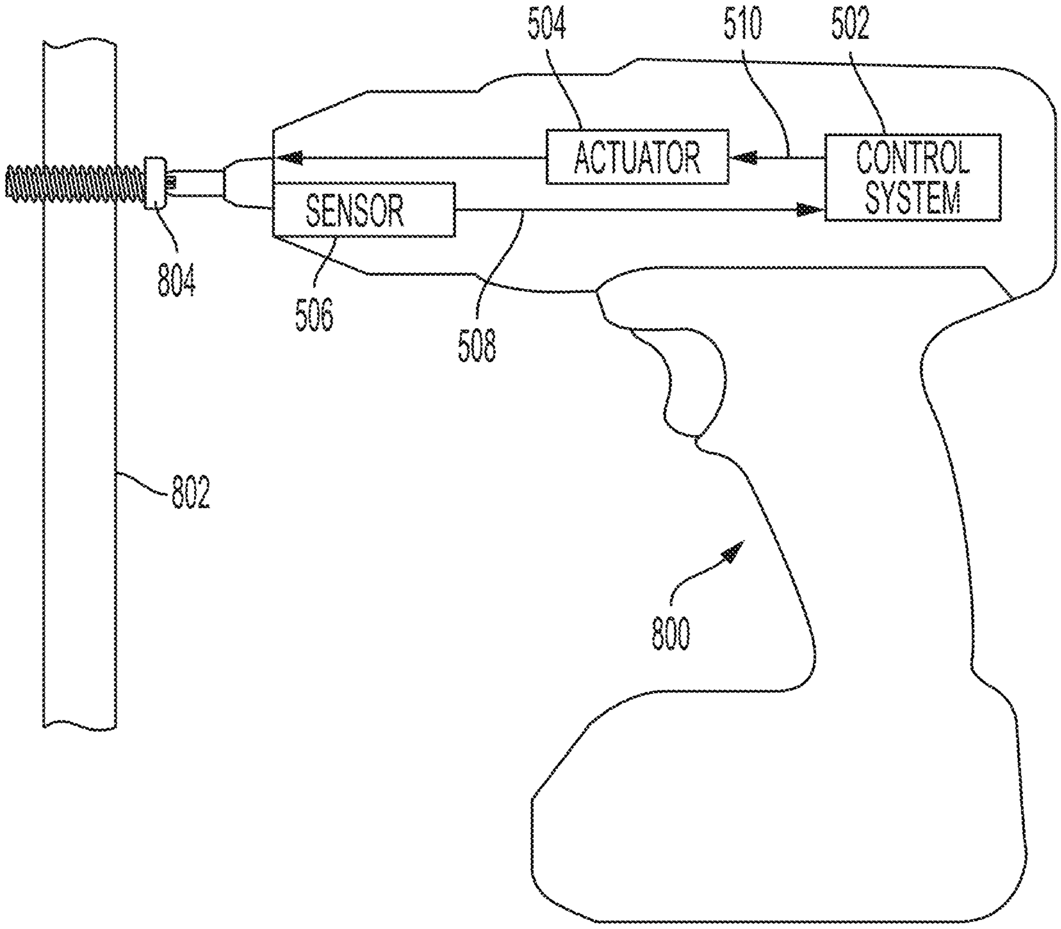
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
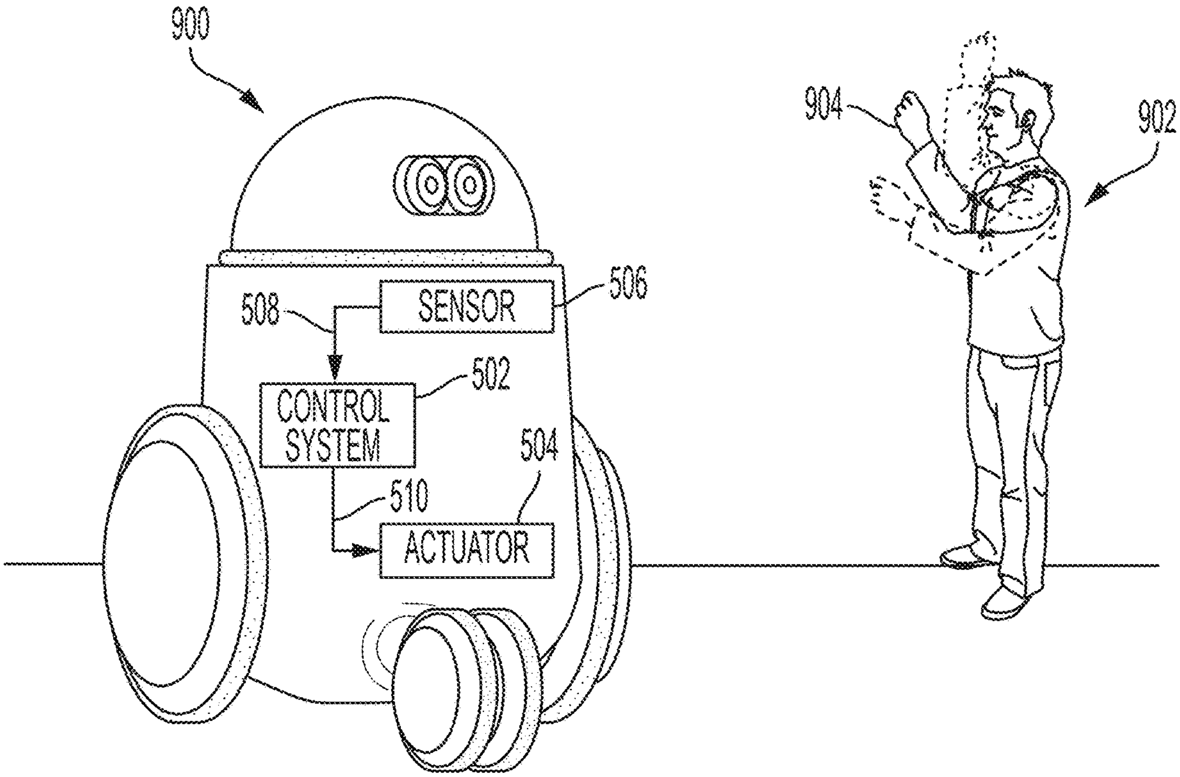
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
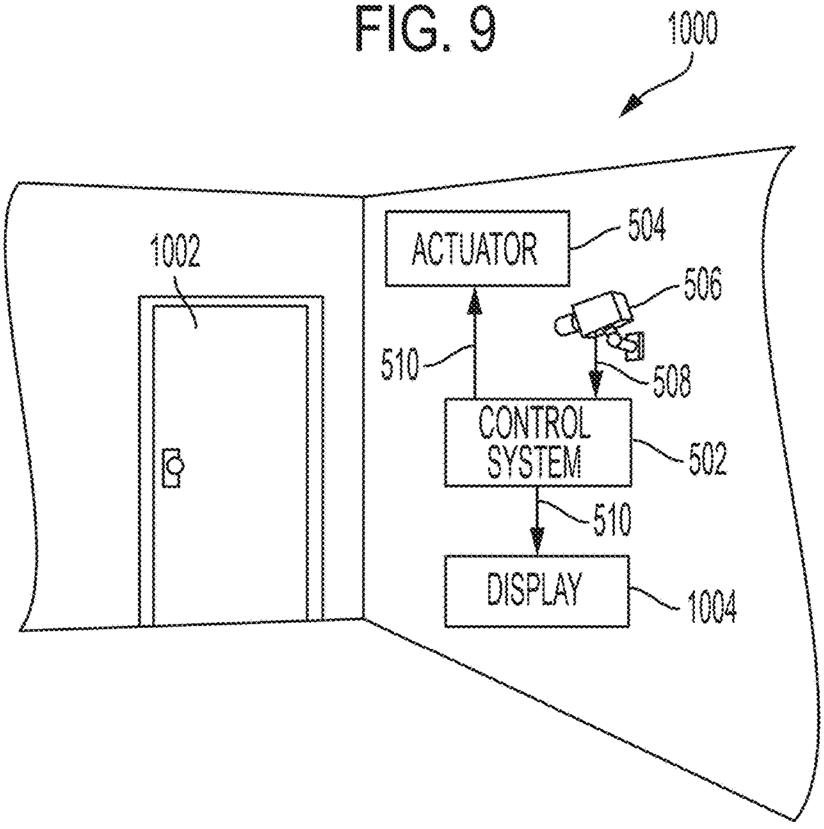
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
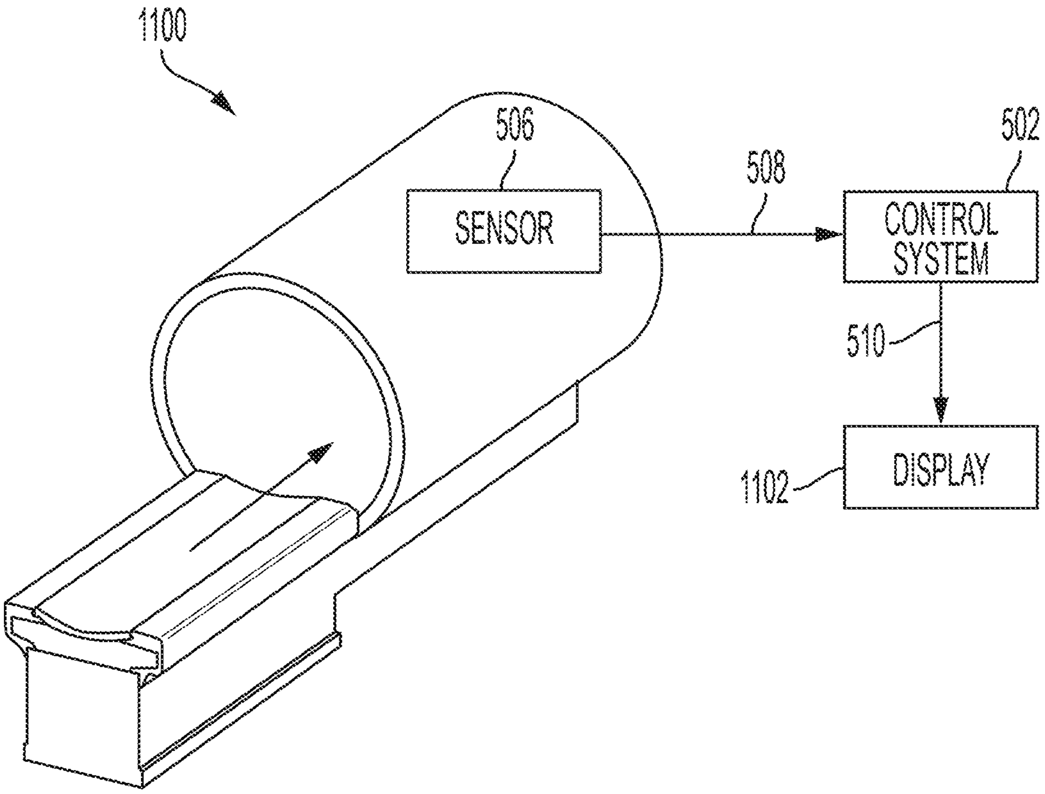
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for training an audio encoder includes receiving first training data comprising first audio data, performing a first training task on an audio encoder using the first training data, receiving second training data comprising first image data and second audio data, and performing a second training task on the audio encoder using the second training data. The method also includes receiving third training data comprising first text data and third audio data, performing a third training task on the audio encoder using the third training data, and performing at least one downstream task using the audio encoder.

In some embodiments, the first training task includes training the audio encoder for supervised classification on an audio dataset with labels. In some embodiments, the second training task includes training the audio encoder by transferring knowledge from a pre-trained image encoder onto the audio encoder. In some embodiments, transferring knowledge from the pre-trained image encoder onto the audio encoder includes using contrastive learning with the second training data. In some embodiments, the third training task includes fine-tuning the audio encoder by transferring knowledge of a pre-trained text encoder onto the audio encoder. In some embodiments, transferring knowledge of the pre-trained text encoder onto the audio encoder includes using contrastive learning with the third training data. In some embodiments, the first training task includes a supervised training task. In some embodiments, the second training task includes a self-supervised training task. In some embodiments, the third training task includes a self-supervised training task. In some embodiments, the at least one downstream task includes audio tagging. In some embodiments, the at least one downstream task includes audio retrieval. In some embodiments, the at least one downstream task includes zero-shot classification.

In some embodiments, a system for training an audio encoder includes a computing device that includes at least one processor and at least one memory, the at least one memory including instructions that, when executed by the at least one processor, cause the at least one processor to: receive first training data comprising first audio data; perform a first training task on an audio encoder using the first training data; receive second training data comprising first image data and second audio data; perform a second training task on the audio encoder using the second training data; receive third training data comprising first text data and third audio data; perform a third training task on the audio encoder using the third training data; and perform at least one downstream task using the audio encoder.

In some embodiments, the first training task includes training the audio encoder for supervised classification on an audio dataset with labels. In some embodiments, the second training task includes training the audio encoder by transferring knowledge from a pre-trained image encoder onto the audio encoder. In some embodiments, the third training task includes fine-tuning the audio encoder by transferring knowledge of a pre-trained text encoder onto the audio encoder. In some embodiments, the first training task includes a supervised training task. In some embodiments, the second training task includes a self-supervised training task. In some embodiments, the third training task includes a self-supervised training task.

In some embodiments, an apparatus for training an audio encoder includes a computing device configured to: receive first training data comprising first audio data; perform a first training task on an audio encoder using the first training data, wherein the first training task includes a supervised learning task that includes training the audio encoder for supervised classification on an audio dataset with labels; receive second training data comprising first image data and second audio data; perform a second training task on the audio encoder using the second training data, wherein the second training task includes a self-supervised learning task that includes training the audio encoder by transferring knowledge from a pre-trained image encoder onto the audio encoder; receive third training data comprising first text data and third audio data; perform a third training task on the audio encoder using the third training data, wherein the third training task includes a self-supervised learning task that includes fine-tuning the audio encoder by transferring knowledge of a pre-trained text encoder onto the audio encoder; and perform at least one downstream task using the audio encoder.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for training an audio encoder, the method comprising:

receiving first training data comprising first audio data;

performing a first training task on an audio encoder using the first training data to train the audio encoder, wherein the first training task includes tasks associated with supervised learning;

receiving second training data comprising first image data and second audio data;

performing a second training task on the audio encoder using the second training data to train the audio encoder, wherein the second training task includes tasks associated with self-supervised learning;

receiving third training data comprising first text data and third audio data;

performing a third training task on the audio encoder using the third training data to train the audio encoder, wherein the third training task is self-supervised learning on text-audio pairs on single and multi-model datasets; and in response to training the audio encoder based on the first training task, second training task, and the third training task, performing at least one downstream task using the audio encoder.

2. The method of claim 1, wherein the first training task includes training the audio encoder for supervised classification on an audio dataset with labels.

3. The method of claim 1, wherein the second training task includes training the audio encoder by transferring knowledge from a pre-trained image encoder onto the audio encoder.

4. The method of claim 3, wherein transferring knowledge from the pre-trained image encoder onto the audio encoder includes using contrastive learning with the second training data.

5. The method of claim 1, wherein the third training task includes fine-tuning the audio encoder by transferring knowledge of a pre-trained text encoder onto the audio encoder.

6. The method of claim 5, wherein transferring knowledge of the pre-trained text encoder onto the audio encoder includes using contrastive learning with the third training data.

7. The method of claim 1, wherein the first training task includes a supervised training task.

8. The method of claim 1, wherein the second training task includes a self-supervised training task.

9. The method of claim 1, wherein the third training task includes a self-supervised training task.

10. The method of claim 1, wherein the at least one downstream task includes audio tagging.

11. The method of claim 1, wherein the at least one downstream task includes audio retrieval.

12. The method of claim 1, wherein the at least one downstream task includes zero-shot classification.

13. A system for training an audio encoder, the system comprising:

a computing device that includes at least one processor and at least one memory, the at least one memory including instructions that, when executed by the at least one processor, cause the at least one processor to:

receive first training data comprising first audio data;

perform a first training task on an audio encoder using the first training data to train the audio encoder;

receive second training data comprising first image data and second audio data;

perform a second training task on the audio encoder using the second training data to train the audio encoder;

receive third training data comprising first text data and third audio data;

perform a third training task on the audio encoder using the third training data to train the audio encoder, wherein the first training task, second training task, and the third training task are different tasks; and in response to training the audio encoder based on the first training task, second training task, and the third training task, perform at least one downstream task using the audio encoder.

14. The system of claim 13, wherein the first training task includes training the audio encoder for supervised classification on an audio dataset with labels.

15. The system of claim 13, wherein the second training task includes training the audio encoder by transferring knowledge from a pre-trained image encoder onto the audio encoder.

16. The system of claim 13, wherein the third training task includes fine-tuning the audio encoder by transferring knowledge of a pre-trained text encoder onto the audio encoder.

17. The system of claim 13, wherein the first training task includes a supervised training task.

18. The system of claim 13, wherein the second training task includes a self-supervised training task.

19. The system of claim 13, wherein the third training task includes a self-supervised training task.

20. An apparatus for training an audio encoder, the apparatus comprising:

a computing device configured to:

receive first training data comprising first audio data;

perform a first training task on an audio encoder using the first training data, wherein the first training task includes a supervised learning task that includes training the audio encoder for supervised classification on an audio dataset with labels;

receive second training data comprising first image data and second audio data;

perform a second training task on the audio encoder using the second training data, wherein the second training task includes a self-supervised learning task that includes training the audio encoder by transferring knowledge from a pre-trained image encoder onto the audio encoder;

receive third training data comprising first text data and third audio data;

perform a third training task on the audio encoder using the third training data, wherein the third training task includes a self-supervised learning task that includes a fine-tuning of the audio encoder by transferring knowledge of a pre-trained text encoder onto the audio encoder; and in response to training the audio encoder based on the first training task, second training task, and the third training task, perform at least one downstream task using the audio encoder.

* * * * *